US012156161B2

(12) United States Patent
Shaheen

(10) Patent No.: US 12,156,161 B2
(45) Date of Patent: Nov. 26, 2024

(54) METHOD AND APPARATUS FOR REPORTING MULTI-USIM UE CAPABILITY IN 5G NR SYSTEM

(71) Applicant: SHARP KABUSHIKI KAISHA, Osaka (JP)

(72) Inventor: Kamel M. Shaheen, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 443 days.

(21) Appl. No.: 17/617,428

(22) PCT Filed: Apr. 2, 2020

(86) PCT No.: PCT/JP2020/015173
§ 371 (c)(1),
(2) Date: Dec. 8, 2021

(87) PCT Pub. No.: WO2020/250548
PCT Pub. Date: Dec. 17, 2020

(65) Prior Publication Data
US 2022/0248362 A1    Aug. 4, 2022

Related U.S. Application Data

(60) Provisional application No. 62/861,316, filed on Jun. 13, 2019.

(51) Int. Cl.
*H04W 60/00*    (2009.01)
*H04W 8/04*    (2009.01)
(Continued)

(52) U.S. Cl.
CPC ........... *H04W 60/005* (2013.01); *H04W 8/04* (2013.01); *H04W 84/042* (2013.01); *H04W 88/06* (2013.01)

(58) Field of Classification Search
CPC ..... H04W 72/51; H04W 76/15; H04W 76/27; H04W 12/08; H04W 60/00; H04W 60/05;
(Continued)

(56) References Cited

U.S. PATENT DOCUMENTS 10,397,891 B2 * 8/2019 Wu ................. H04W 76/15
10,856,248 B2 * 12/2020 Chun ............... H04W 12/08
(Continued)

FOREIGN PATENT DOCUMENTS

WO    WO-2020250548 A1 * 12/2020 .......... H04W 60/005

OTHER PUBLICATIONS

C. Yu, S. Chen, Z. Wei and F. Wang, "Toward a Truly Secure Telecom Network:Analyzing and Exploiting Vulnerable Security Configurations/Implementations in Commercial LTE/IMS Networks," in IEEE Transactions on Dependable and Secure Computing, doi: 10.1109/TDSC.2023.3322267. (Year: 2023).*
(Continued)

*Primary Examiner* — William D Cumming
(74) *Attorney, Agent, or Firm* — ScienBiziP, P.C.

(57) ABSTRACT

A user equipment (UE) for wireless communication is disclosed. The UE includes one or more non-transitory computer-readable media having computer-executable instructions embodied thereon, at least one processor coupled to the one or more non-transitory computer-readable media, and configured to execute the computer-executable instructions to: detect a presence of a first USIM and a second USIM in the UE, the first and second USIMs belonging to the same network, and send a message, using the first USIM, to the network through either an access registration procedure or a registration update procedure, the message indicating the presence of the first and second USIMs and capabilities associated with the first and second USIMs.

5 Claims, 11 Drawing Sheets

(51) Int. Cl.
*H04W 84/04* (2009.01)
*H04W 88/06* (2009.01)

(58) Field of Classification Search
CPC ....... H04W 8/20; H04W 72/15; H04W 72/21; H04W 74/0833; H04W 8/04
USPC .......................................................... 370/329
See application file for complete search history.

(56) References Cited

U.S. PATENT DOCUMENTS

| | | | | |
|---|---|---|---|---|
| 11,974,327 | B2 * | 4/2024 | Park | H04W 76/15 |
| 12,035,269 | B2 * | 7/2024 | Shaheen | H04W 60/005 |
| 2018/0041981 | A1 * | 2/2018 | Wu | H04W 72/51 |
| 2020/0084741 | A1 * | 3/2020 | Chun | H04W 12/08 |
| 2022/0109976 | A1 * | 4/2022 | Ozturk | H04W 76/27 |
| 2022/0248362 | A1 * | 8/2022 | Shaheen | H04W 60/005 |
| 2022/0272761 | A1 * | 8/2022 | Park | H04W 74/0833 |
| 2022/0330202 | A1 * | 10/2022 | Kumar | H04W 60/00 |
| 2022/0360969 | A1 * | 11/2022 | Ying | H04W 8/20 |
| 2022/0361133 | A1 * | 11/2022 | Shaheen | H04W 8/20 |
| 2023/0189268 | A1 * | 6/2023 | Kim | H04W 72/21 370/329 |

OTHER PUBLICATIONS

"Universal Mobile Telecommunications System (UMTS); LTE; Test specification for (U)SIM; Application Programming Interface (API) for Java Card™(3GPP TS 31.213 version 15.0.0 Release 15)", ETSI TS 131 213 V15.0.0 (Jul. 2018).

Intel, "New WID: Service Support for Multi-USIM devices", S1-190110, 3GPP TSG-SA WG1 Meeting #85, Tallin, Estonia, Feb. 18-22, 2019.

Ericsson, "Dual-SIM Dual-Standby UEs and their impact on the RAN", R2-115375, 3GPP TSG-RAN WG2 #75bis, Zhuhai, China Oct. 10-14, 2011.

* cited by examiner

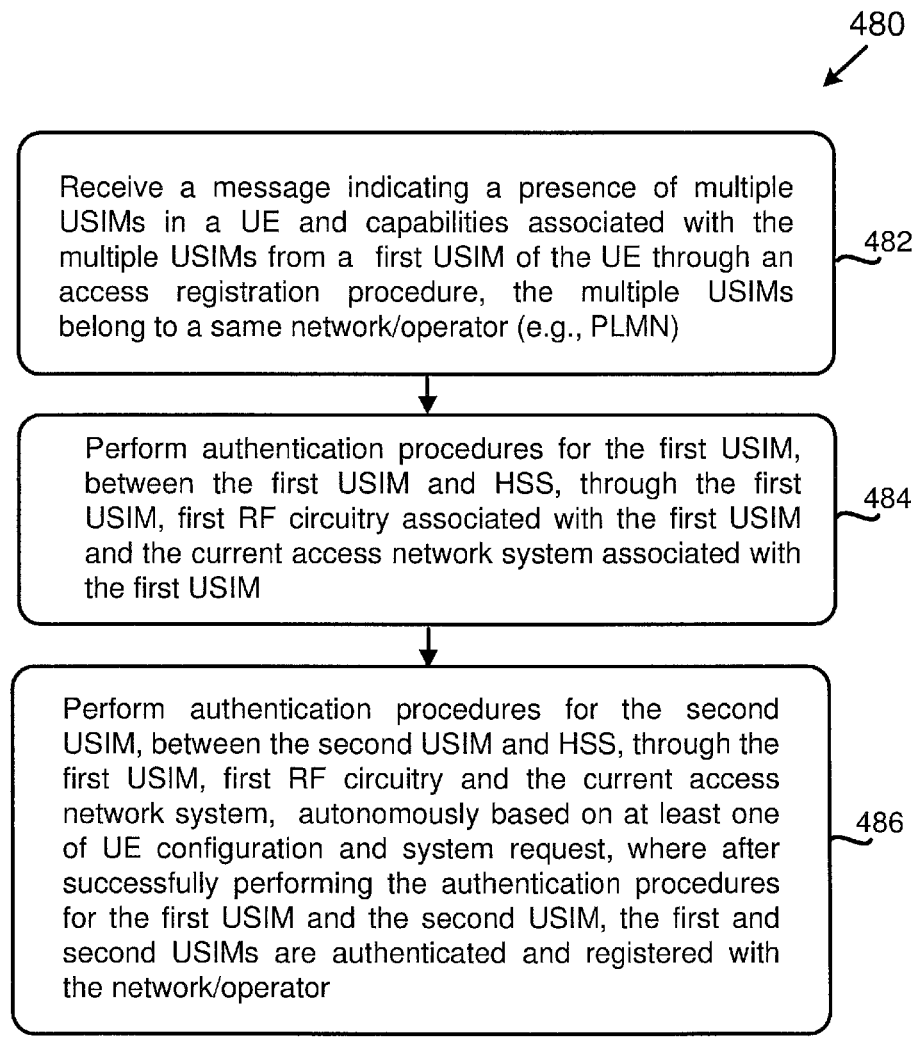

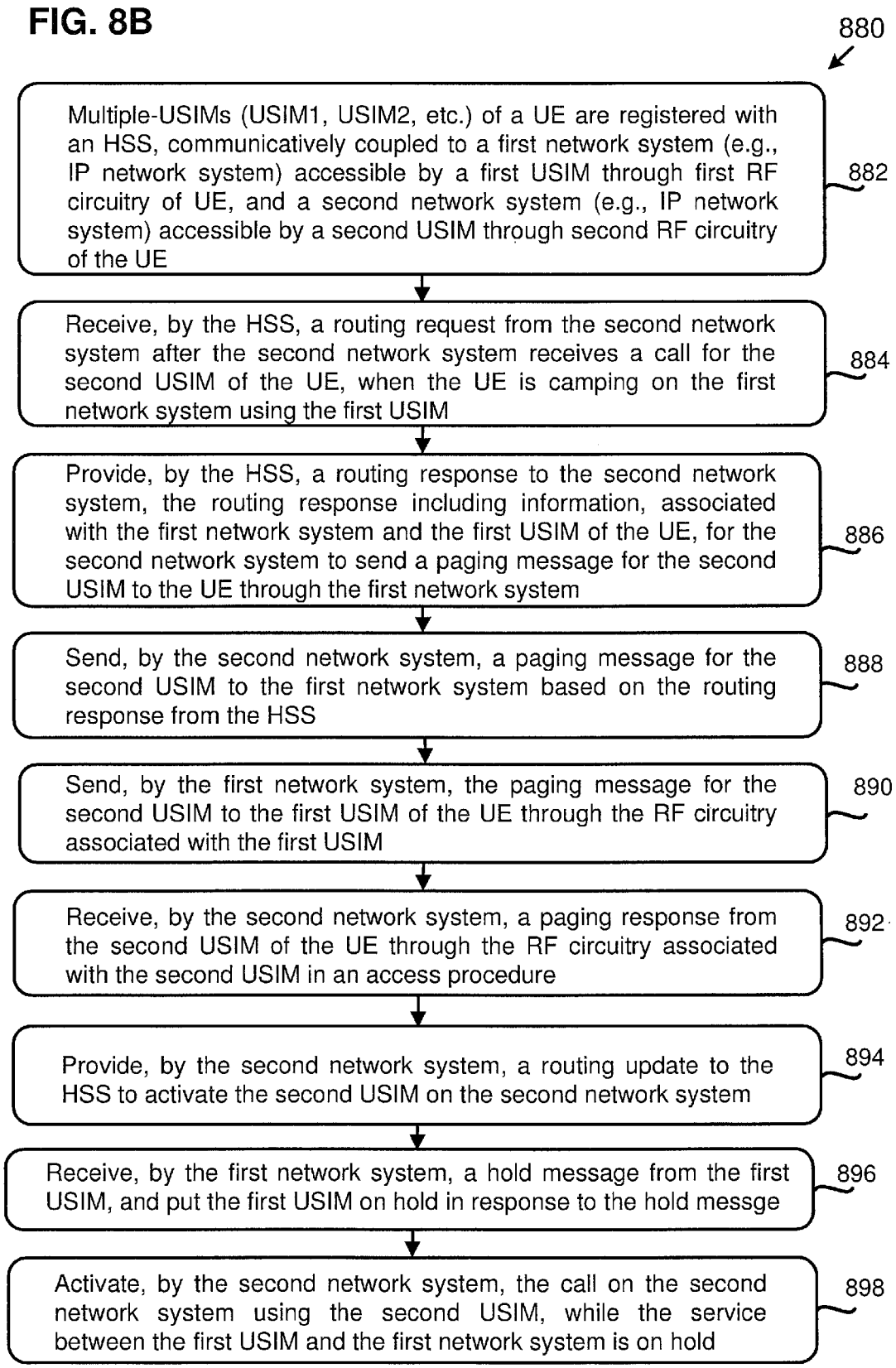

METHOD AND APPARATUS FOR REPORTING MULTI-USIM UE CAPABILITY IN 5G NR SYSTEM

TECHNICAL FIELD

The present disclosure generally relates to wireless communication, and more particularly, to multiple-universal subscriber identity module (USIM) user equipment (UE) operations.

BACKGROUND ART

In wireless communication systems, support for multi-USIM in a UE is handled in an implementation-specific manner without any support from 3rd Generation Partnership Project (3GPP) specifications, resulting in a variety of implementations and UE behaviors. In a multi-USIM device, the USIMs typically share common radio and baseband components. Thus, the multi-USIM device may register in different networks but using one radio front-end (RF) and base band.

In the next generation (e.g., fifth generation (5G) new radio (NR)) wireless communication networks, a multi-USIM UE is expected to be in Radio Resource Control (RRC) Connected state with only one network at a time, while being able to receive paging, perform signal measurements, or read system information, and determine if it needs to respond to paging requests from other networks. With a single RF plate-form, however, the UE must listen to paging of the other connection(s), and the network needs to be aware of the multi-registration scenario. When a UE is paged on a second system while connected to a first system, the paged UE may drop the connection on the first system and attempt to access the second system without releasing the first connection due to lack of time to switch systems. Such behaviors can cause performance degradations and reductions in overall system capacity.

On the network end, the current network systems remain ignorant of the UEs' capability to support multiple USIMs. In order to support multi-USIM UEs, the network systems need to be aware of such capabilities in order to coordinate the operations of multi-USIM registrations, potential simultaneous operations and collision avoidance.

Thus, there is a need in the art for multi-USIM UE and multi-network coordination.

SUMMARY OF INVENTION

In one example, a user equipment (UE) for wireless communication, the UE comprising: one or more non-transitory computer-readable media having computer-executable instructions embodied thereon; at least one processor coupled to the one or more non-transitory computer-readable media, and configured to execute the computer-executable instructions to: detect a presence of a first multiple-universal subscriber identity module (USIM) and a second USIM in the UE, the first and second USIMs belonging to a same Public Land Mobile Network (PLMN); send a message, using the first USIM, to the PLMN through either an access registration procedure or a registration update procedure, the message indicating the presence of the first and second USIMs and capabilities associated with the first and second USIMs.

In one example, a Home Subscriber Server (HSS) comprising: one or more non-transitory computer-readable media having computer-executable instructions embodied thereon; at least one processor coupled to the one or more non-transitory computer-readable media, and configured to execute the computer-executable instructions to: receive a message indicating a presence of a first multiple-universal subscriber identity module (USIM) and a second USIM in a user equipment (UE) and capabilities associated with the first and second USIMs from the first USIM in the UE through either an access registration procedure or a registration update procedure; wherein the first and second USIMs belong to a same Public Land Mobile Network (PLMN).

In one example, a method for multi-Universal Subscriber Identity Module (USIM) operation of a user equipment (UE) in a Public Land Mobile Network (PLMN), the method comprising: detecting, by the UE, a presence of a first multiple-universal subscriber identity module (USIM) and a second USIM in the UE, the first and second USIMs belonging to the PLMN; sending, by the UE, a message indicating the presence of the first and second USIMs and capabilities associated with the first and second USIMs to a Home Subscriber Sever (HSS) of the PLMN through either an access registration procedure or a registration update procedure.

BRIEF DESCRIPTION OF DRAWINGS

Implementations of the present technology will now be described, by way of example only, with reference to the attached figures.

FIG. 4B is a flowchart diagram illustrating a method of a network for registering multiple USIMs and associated capabilities from a multi-USIM UE through an access registration procedure, in accordance with example implementations of the present disclosure.

FIG. 8B is a flowchart diagram illustrating a method of a network for activating a service (e.g., a call and/or data session) with a UE on a second network system while maintaining a network connection with the UE on a first network system, in accordance with example implementations of the present disclosure.

DESCRIPTION OF EMBODIMENTS

Figure 1:
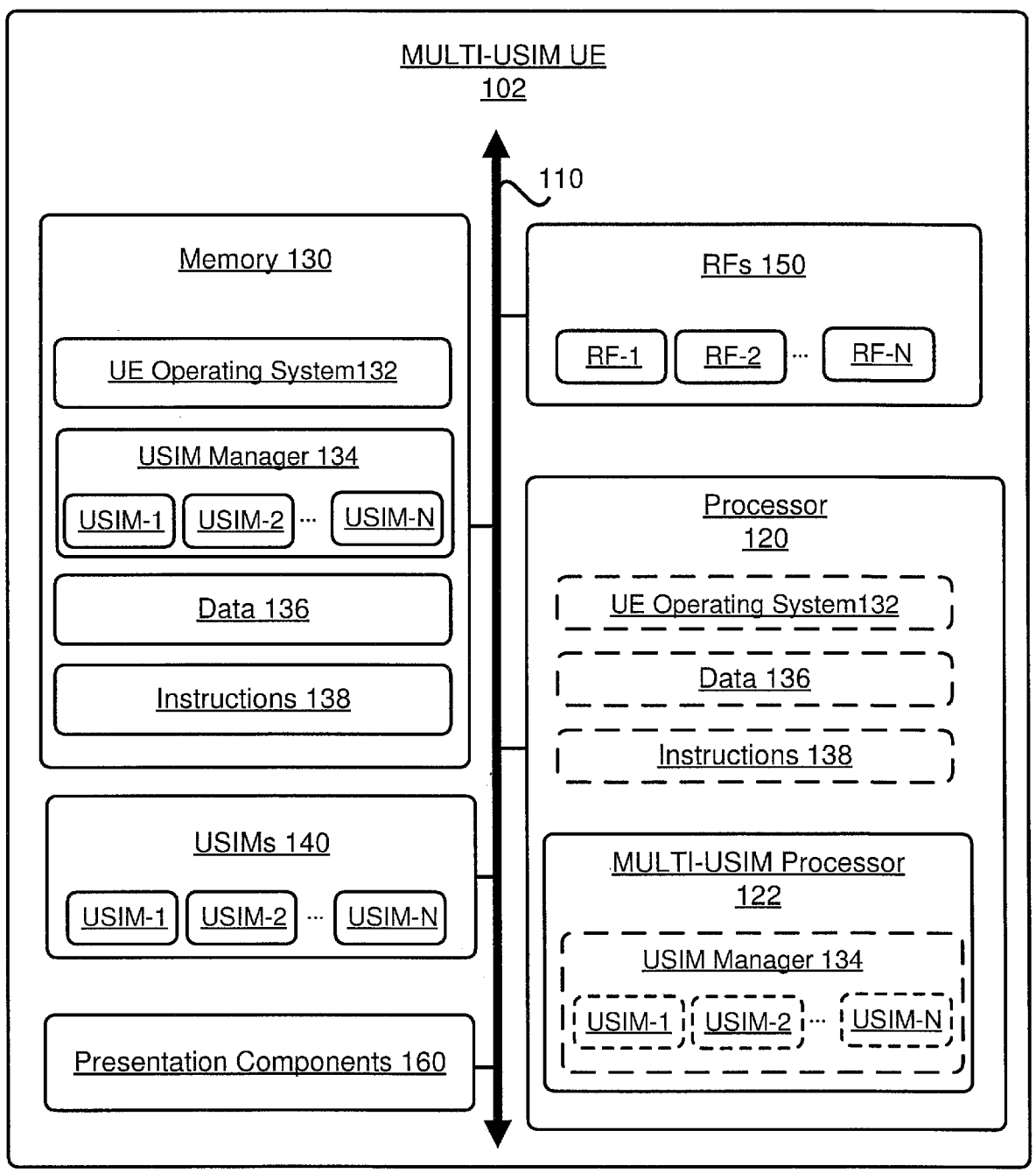
FIG. 1 is a block diagram of a multi-USIM UE, in accordance with various example implementations of the present disclosure.

The 3GPP is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access network system (E-UTRAN).

At least some aspects of the systems and methods disclosed herein may be described in relation to the 3GPP LTE, LTE-Advanced (LTE-A) and other standards (e.g., 3GPP Releases 8, 9, 10, 11, 12, 13, 14 and/or 15) including New Radio (NR) which is also known as 5G. However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB), a next Generation Node B (gNB) or some other similar terminology. As the scope of the disclosure should not be limited to 3GPP standards, the terms "base station," "Node B," "eNB," "HeNB," and "gNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB and gNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The 5th generation communication systems, dubbed NR (New Radio technologies) by 3GPP, envision the use of time/frequency/space resources to allow for services, such as eMBB (enhanced Mobile Broad-Band) transmission, URLLC (Ultra-Reliable and Low Latency Communication) transmission, and eMTC (massive Machine Type Communication) transmission. Also, in NR, single-beam and/or multi-beam operations is considered for downlink and/or uplink transmissions.

In order for the services to use the time/frequency/space resource efficiently, it would be useful to be able to efficiently control uplink transmissions. Therefore, a procedure for efficient control of uplink transmissions should be designed. However, the detailed design of a procedure for uplink transmissions has not been studied yet.

According to the systems and methods described herein, a UE may transmit multiple reference signals (RSs) associated with one or more Transmission Reception Points (TRPs) on a UL antenna port. For example, multiple UL RSs respectively associated with one or more TRPs may be transmitted on a UL antenna port. Namely, there may be one or more UL RSs transmitted per UL antenna port. Also, there may be one or more UL RSs transmitted per TRP.

In an example, one TRP may be associated with one UL antenna port. In another example, one TRP may be associated with multiple UL antenna port(s). In another example, multiple TRP(s) may be associated with multiple UL antenna port(s). In yet another example multiple antenna port(s) may be associated with one UL antenna port. The TRP(s) described herein are assumed to be included in the antenna port(s) for the sake of simple description.

Here, for example, multiple UL RSs transmitted on an UL antenna port may be defined by a same sequence (e.g., a demodulation reference signal sequence, and/or a reference signal sequence). For example, the same sequence may be generated based on a first parameter configured by a higher layer. The first parameter may be associated with a cyclic shift, and/or information associated with a beam index.

Or, multiple UL RSs transmitted on an UL antenna port may be identified by a different sequence. Each of the different signal sequence may be generated based on each of more than one second parameter(s) configured by a higher layer. One second parameter among more than one second parameters may be indicated by DCI. Each of the second parameters may be associated with a cyclic shift, and/or information associated with a beam index.

Also, resource element(s) to which multiple UL RSs transmitted on a UL antenna port are mapped may be defined by the same value of a frequency shift. For example, the same value of the frequency shift may be given by a third parameter configured by a higher layer. The third information may be associated with a beam index.

Alternatively, resource element(s) to which multiple UL RSs transmitted on a UL antenna port are mapped may be identified by different values of a frequency shift. Each of the different values of the frequency shift may be given by each of more than one fourth parameter(s) configured by a higher layer. One fourth parameter among more than one parameters may be indicated by DCI. Each of the fourth parameters may be associated with a beam index.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram of a multi-USIM UE, in accordance with various example implementations of the present disclosure. As shown in FIG. 1, multi-USIM UE 102 may include processor 120, memory 130, multiple USIMs 140, multiple Radio Front-end circuitries (RFs) 150, and one or more presentation components 160. Multi-USIM UE 102 may also include one or more radio frequency spectrum band modules, one or more base station communications modules, one or more network communications modules, and one or more system communications management modules, Input/Output (I/O) ports, I/O components, and power supply (not explicitly shown in FIG. 1). Each of these components may be in communication with each other, directly or indirectly, over one or more buses 110.

In various implementations of the present disclosure, processor 120 (e.g., having processing circuitry) may include an intelligent hardware device, e.g., a Central Processing Unit (CPU), a microcontroller, an ASIC, and etc. Processor 120 may also include memory storage. As illustrated in FIG. 1, processor 120 may be responsible for running UE operating system 132, and processing data 136 and instructions 138 received from memory 130, information through RFs 150, the base band communications module, and/or the network communications module. Processor 120 may also process information to be sent to RFs 150 for transmission to the network communications module for transmission to a core network. In the present implementation, processor 120 may include multi-USIM processor 122 for processing instructions from USIM manager 134 for one or more of USIMs of multi-USIM UE 102, for example.

As illustrated in FIG. 1, memory 130 may store UE operating system 132, USIM manager 134, data 136, and computer-readable, computer-executable instructions 138 (e.g., software codes) that are configured to, when executed, cause processor 120 to perform various functions described herein. Alternatively, USIM manager 134 and/or instructions 138 may not be directly executable by processor 120 but be configured to cause multi-USIM UE 102 (e.g., when compiled and executed) to perform various functions described herein.

In various implementation of the present disclosure, memory 130 may include a variety of computer-readable media. Computer-readable media may be any available media that may be accessed by multi-USIM UE 102 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable.

Computer storage media includes RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media. In various implementation of the present disclosure, memory 130 may include computer-storage media in the form of volatile and/or non-volatile memory. Memory 130 may be removable, non-removable, or a combination thereof. Example memory includes solid-state memory, hard drives, optical-disc drives, and etc.

As illustrated in FIG. 1, multi-USIM UE 102 may include multiple USIMs 140, such as USIM-1, USIM-2, through USIM-N. Each of USIM-1 through USIM-N may belong to a same or different network/operator (e.g., Public Land Mobile Network (PLMN)). It should be noted that, although USIMs are described in the present implementation and various implementations of the present disclosure, other subscriber identity modules or subscriber identification modules (e.g., SIMs) can also be used.

As shown in FIG. 1, multi-USIM UE 102 may include multiple RFs 150, such as RF-1, RF-2, through RF-N. Each of the RFs 150 may include a transmitter (e.g., transmitting/transmission circuitry) and a receiver (e.g., receiving/reception circuitry). In some implementations of present disclosure, RF-1, RF-2, through RF-N of RFs 150 may respectively correspond to USIM-1, USIM-2, through USIM-N, where USIM-1, USIM-2, through USIM-N may transmit and/or receive data and control channels, for example, through RF-1, RF-2, through RF-N, respectively.

As shown in FIG. 1, multi-USIM UE 102 may include presentation components 160 for presenting data indications to a person or other device. Examples of presentation components 160 may include a display device, speaker, printing component, vibrating component, etc.

Figure 2:
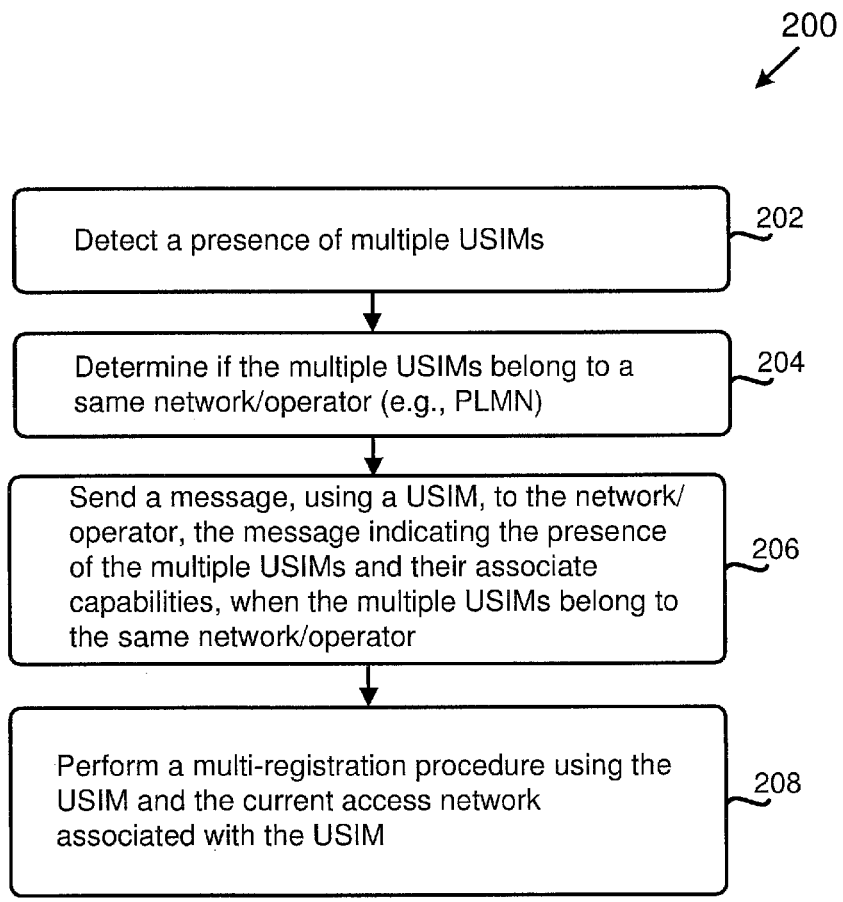
FIG. 2 is a flowchart diagram illustrating a method of a UE for performing multi-USIM registration in a communication network, in accordance with example implementations of the present disclosure.

FIG. 2 is a flowchart diagram illustrating a method of a UE for performing multi-USIM registration in a communication network, in accordance with example implementations of the present disclosure. As illustrated in FIG. 2, flowchart 200 may include actions 202, 204, 206, and 208. In one implementation, the UE described in flowchart 200 may correspond to multi-USIM UE 102 in FIG. 1.

In action 202, the UE may detect a presence of multiple USIMs in the UE. In one implementation, before the UE is powered on, two or more USIMs are inserted into the USIM card slots of the UE, for example. When the UE is powered on, the UE (e.g., through multi-USIM processor 122 and USIM manager 134 in FIG. 1) may detect the presence of the multiple USIMs. In another implementation, the UE is initially powered on with a first USIM, and a second USIM is later inserted into the UE. The UE (e.g., through multi-USIM processor 122 and USIM manager 134 in FIG. 1) may detect the second USIM while the UE is operating with the first USIM already registered with the network.

In action 204, the UE may determine if the multiple USIMs belong to a same network/operator. In one implementation, the UE may check the operator IDs (e.g., PLMN IDs) associated with the USIMs in the UE to determine if the multiple USIMs belong to the same network/operator. For example, when the PLUM IDs of the USIMs are the same, then the multiple USIMs belong to the same network/operator.

In action 206, when the multiple USIMs belong to the same network/operator, the UE may send a message, using one of the USIMs (e.g., a preferred USIM) and a preferred access network system associated with the selected USIM, to the network/operator. The message may indicate to the network/operator that there are multiple USIMs present (or active) in the UE. The message may also indicate or include the associated capabilities of each USIM. In some implementations, the message may include, for example, Non-Access Stratum (NAS) capabilities (e.g., notification forwarding, etc.) associated with each of the USIMs. In some implementations, the message may include, for example, Access Stratum (AS) capabilities (e.g., single transmitter, dual-reception radio, etc.) associated with each of the USIMs.

In action 208, the UE may perform a multi-USIM registration (or multi-registration) procedure using the selected USIM and the current access network system associated with the selected USIM. The multi-registration procedure will be discussed below.

Figure 3:
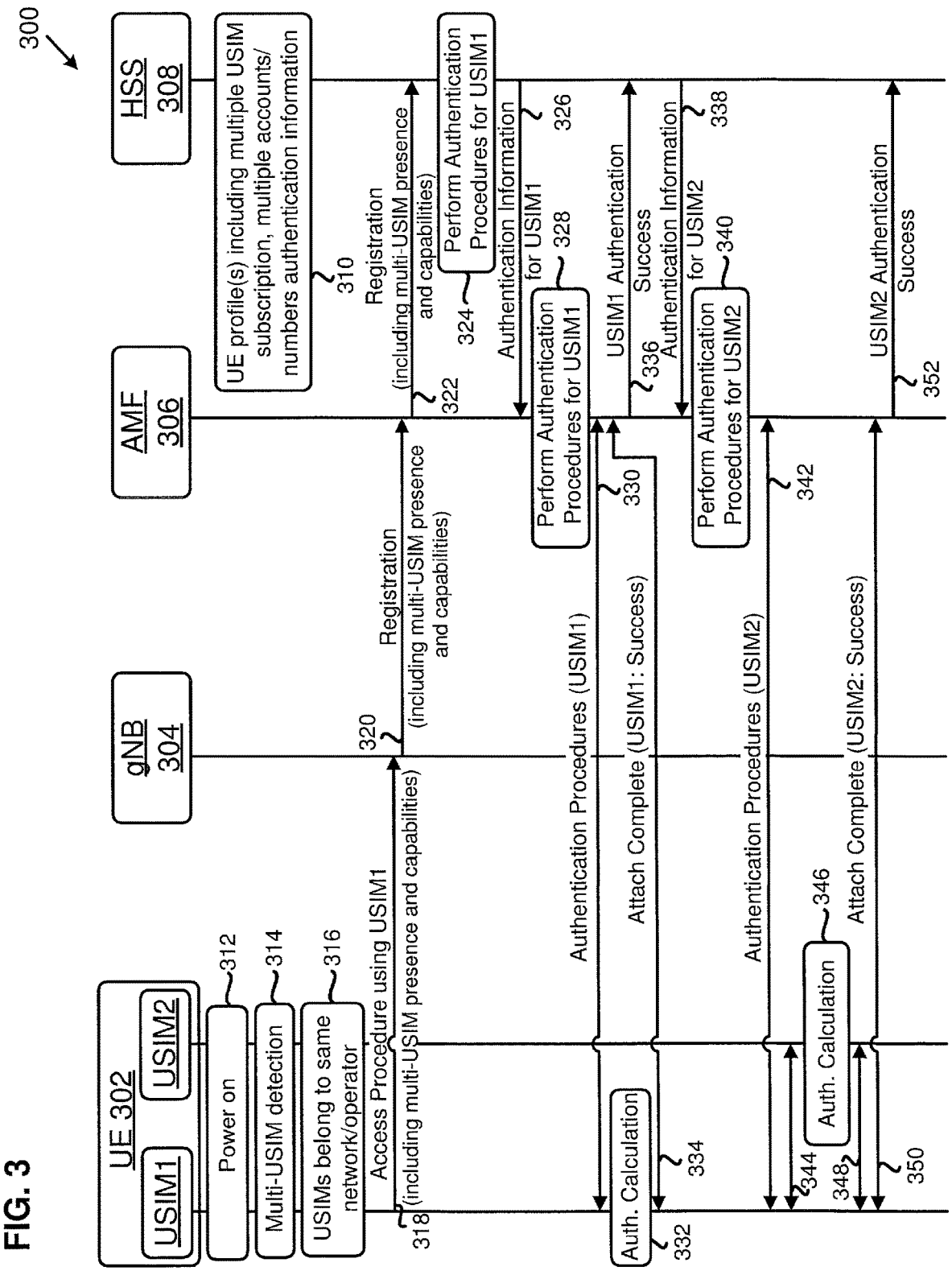
FIG. 3 is a signaling sequence diagram for schematically illustrating a method of reporting a multi-USIM presence in a UE and capabilities of the multiple USIMs to a wireless communication network through an access registration procedure, in accordance with example implementations of the present disclosure.

FIG. 3 is a signaling sequence diagram for schematically illustrating a method of reporting a multi-USIM presence in a UE and capabilities of the multiple USIMs to a wireless communication network through an access registration procedure, in accordance with example implementations of the present disclosure.

As shown in FIG. 3, in diagram 300, UE 302 may report the multi-USIM presence and the capabilities associated with the each USIM to Home Subscriber Server (HSS) 308 through next generation NodeB (gNB) 304 and Access and Mobility Management Function (AMF) 306, for example, through one or more of actions 310, 312, 314, 316, 318, 320, 322, 324, 326, 328, 330, 332, 334, 336, 338, 340, 342, 344, 346, 348, 350, and 352. In one implementation, UE 302 described in diagram 300 may correspond to multi-USIM UE 102 in FIG. 1. It should be noted that, in diagram 300, although UE 302 is shown to include two USIMs (USIM1 and USIM2), UE 302 may include and support more than two USIMs.

In action 310, HSS 308 may store UE profiles including multi-USIM subscriptions, multiple accounts/numbers authentication information for one or more UEs.

In action 312, UE 302 may be powered on. For example, UE 302 is turned on by a user.

In action 314, UE 302 may detect a presence of multiple USIMs. For example, when UE 302 is powered on, UE 302 (e.g., through multi-USIM processor 122 and USIM manager 134 in FIG. 1) may detect the presence of more than one USIM. In the present implementation, before UE 302 is powered on, USIM1 and USIM2 are inserted into the USIM card slots of UE 302, for example. Thus, upon being powered on, UE 302 detects the presence of both USIM1 and USIM2.

In action 316, UE 302 may determine if USIM1 and USIM2 belong to a same network/operator. In one implementation, UE 302 may check the operator IDs (e.g., PLMN IDs) associated with USIM1 and USIM2 to determine if the operator IDs are the same. For example, each operator ID may include a mobile country code (MCC) and a mobile network code (MNC). When the MCC and MNC of USIM1 match those of USIM2, then UE 302 determines that USIM1 and USIM2 belong to the same network/operator.

In action 318, UE 302 may initiate an access procedure with gNB 304 using USIM1 and the associated RF circuitry (e.g., RF1 in FIG. 1) of USIM1. In one implementation, USIM1 may be preferred over USIM2, for example, based on reference signal received power (RSRP), network condition, etc. In action 318, UE 302 may send a message to gNB 304 using USIM1, the associated RF circuitry, and the corresponding access network system of USIM1. The message may include information indicating the presence of USIM1 and USIM2 in UE 302. In addition to the typical USIM related information (e.g., USIM1 related information), the message may also include USIM2 related information (e.g., phone number, international mobile subscriber identity (IMSI), International Mobile Equipment Identity (IMEI), Temporary Mobile Subscriber Identity (TMSI), etc.) and the associated capabilities (e.g., NAS and/or AS capabilities) of each of USIM1 and USIM2.

In action 320, gNB 304 may send the message having the multi-USIM presence and associated capabilities of USIM1 and USIM2 to AMF 306 through a registration procedure.

In action 322, AMF 306 may send the message having the multi-USIM presence and associated capabilities of USIM1 and USIM2 to HSS 308 through the registration procedure. In one implementation, actions 318, 320 and 320 may together be referred to as an access registration procedure.

In actions 324 through 336, as part the initial Attach, AMF 306 and HSS 308 may perform authentication of USIM1. In action 324, HSS 308 may initiate the authentication procedures of USIM1.

In action 326, HSS 308 may send authentication information for USIM1 to AMF 306. For example, HSS 308 may send an authentication token (AUTN), an expected response (XRES) and a random number (RAND) used to generate the XRES to AMF 306 for the authentication of USIM1.

In action 328, AMF 306 may perform the authentication procedures for USIM1 based on the authentication information from HSS 308.

In actions 330, AMF 306 may send an authentication request for USIM1 to USIM1 of UE 302, for example, including the RAND and the AUTN which it received from HSS 308.

In action 332, a USIM processor (e.g., multi-USIM processor 122 in FIG. 1) of UE 302 may process the authentication request, using the RAND it received and its preshared secret key to generate authentication parameters through authentication calculation.

In action 334, UE 302 may send an authentication response back to AMF 306, including a Response (RES). If the RES of USIM1 from UE 302 matches the XRES AMF 306 received from HSS 308, then USIM1 is authenticated successfully. As such, the Attach is complete for USIM1, and AMF 306 may start managing USIM1 of UE 302.

In action 336, AMF 306 may send a USIM1 authentication success message to HSS 308.

In actions 338 through 352, upon the Attach is complete for USIM1, AMF 306 and HSS 308 may continue to perform authentication of USIM2. The authentication procedures for USIM2 may be performed, between USIM2 and HSS 308 through AMF 306, using USIM1 and the RF circuitry associated with USIM1 (e.g., RF1 in FIG. 1), autonomously based on at least one of UE 302's configuration and a system request.

In action 338, HSS 326 may send authentication information for USIM2 to AMF 306. For example, HSS 308 may send an authentication token (AUTN), an expected response (XRES) and a random number (RAND) used to generate the XRES to AMF 306 for the authentication of USIM2.

In action 340, AMF 306 may perform the authentication procedures for USIM2 based on the authentication information from HSS 308.

In actions 342, AMF 306 may send an authentication request for USIM2 to USIM1 of UE 302. The authentication request may be received by UE 302 through USIM1 and the RF circuitry associated with USIM1 (e.g., RF1 in FIG. 1). The authentication request may include the RAND and the AUTN which it received from HSS 308.

In action 344, a USIM manager (e.g., USIM manager 134 in FIG. 1) of UE 302 convey the authentication request from USIM1 to USIM2, for example, through tunneling.

In action 346, a USIM processor (e.g., multi-USIM processor 122 in FIG. 1) of UE 302 may process the authentication request, using the RAND it received and its preshared secret key to generate authentication parameters through authentication calculation.

In action 348, USIM2 may send an authentication response of USIM2, including a Response (RES), back to USIM1.

In action 350, USIM1 may send the authentication response of USIM2 back to AMF 306 through USIM1 and the RF associated with USIM1. If the RES of USIM2 from UE 302 matches the XRES AMF 306 received from HSS 308, then USIM2 is authenticated successfully.

In action 350, the Attach is complete for USIM2, and AMF 306 may start managing USIM2 of UE 302.

In action 352, AMF 306 may send a USIM2 authentication success message to HSS 308.

Figure 4A:
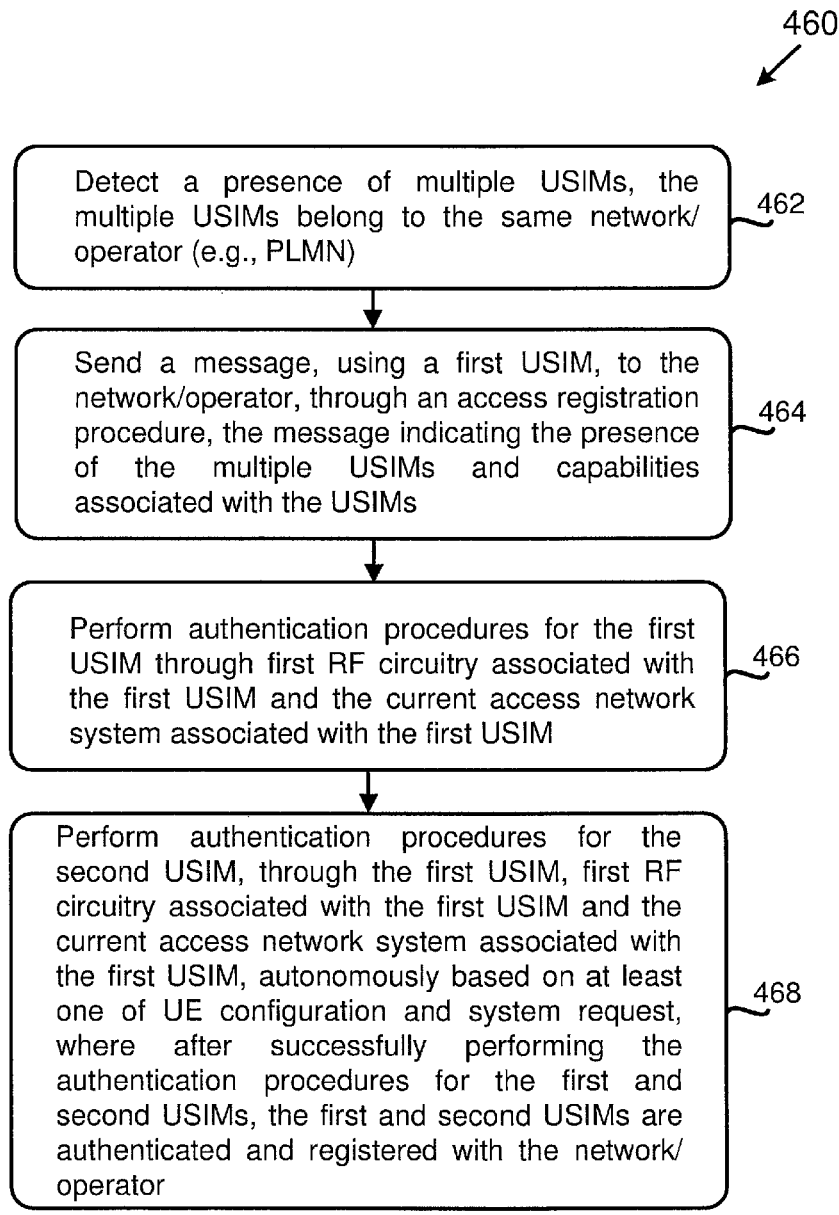
FIG. 4A is a flowchart diagram illustrating a method of a UE for multi-USIM registration in a wireless communication network through an access registration procedure, in accordance with example implementations of the present disclosure.

FIG. 4A is a flowchart diagram illustrating a method of a UE for multi-USIM registration in a wireless communication network through an access registration procedure, in accordance with example implementations of the present disclosure. As illustrated in FIG. 4A, flowchart 460 may include actions 462, 464, 466, and 468. In the present implementation, the UE may correspond to multi-USIM UE 302 in FIG. 3.

In action 462, the UE may detect a presence of multiple USIMs in the UE. With reference to FIG. 3, before UE 302 is powered on, USIM1 and USIM2 are inserted into the USIM card slots of UE 302, for example. When UE 302 is powered on, UE 302 (e.g., through multi-USIM processor 122 and USIM manager 134 in FIG. 1) may detect the presence of USIM1 and USIM2 (e.g., action 314 in FIG. 3). UE 302 may further determine that USIM1 and USIM2 belong to a same network/operator, for example, when the operator IDs (e.g., PLMN IDs) of USIM1 and USIM2 match (e.g., action 316 in FIG. 3).

In action 464, the UE may send a message, using a first USIM, to the network/operator, through an access registration procedure, the message indicating the presence of the multiple USIMs and capabilities associated with the USIMs. For example, in FIG. 3, UE 302 may send the message, using USIM1 (e.g., the preferred USIM) and the access network system associated with USIM1, to the network/operator (e.g., through gNB 304), through the access registration procedure (e.g., actions 318, 320, and 322 in FIG. 3). The message indicates to AMF 306 that there are multiple USIMs present in UE 302. In addition to USIM1 related information (e.g., phone number, IMSI, IMEI, TMSI, etc.), the message may include USIM2 related information (e.g., phone number, IMSI, IMEI, TMSI, etc.) and the associated capabilities (e.g., NAS and/or AS capabilities) of each of USIM1 and USIM2.

In action 466, the UE may perform authentication procedures for the first USIM through first RF circuitry associated with the first USIM and the current access network system associated with the first USIM. For example, in FIG. 3, UE 302 may perform authentication procedures for USIM1 through the RF circuitry associated with USIM1 (e.g., RF1 in FIG. 1) and the current access network system associated with USIM1 (e.g., actions 330, 332, and 334 in FIG. 3).

In action 468, the UE may perform authentication procedures for the second USIM, through the first USIM, the first RF circuitry associated with the first USIM and the current access network system associated with the first USIM, autonomously based on at least one of a UE configuration and a system request. After successfully performing the authentication procedures for the first and second USIMs, the first and second USIMs are authenticated and registered with the network/operator. For example, in FIG. 3, UE 302 may perform authentication procedures for USIM2 through USIM1, the RF circuitry associated with USIM1 (e.g., RF1 in FIG. 1), and the current access network system associated with USIM1, autonomously based on at least one of UE 302's configuration and a system request (e.g., actions 342, 344, 346, 348 and 350 in FIG. 3). After successfully performing the authentication procedures for USIM1 and USIM2, USIM1 and USIM2 are authenticated and registered with AMF 306 and HSS 308.

FIG. 4B is a flowchart diagram illustrating a method of a network for registering multiple USIMs and associated capabilities from a multi-USIM UE through an access registration procedure, in accordance with example implementations of the present disclosure. As illustrated in FIG. 4B, flowchart 480 may include actions 482, 484, and 486. In the one implementation, the network may include, not is not limited to, gNB 304, AMF 306, and HSS 308 in FIG. 3.

In action 482, the network may receive a message indicating a presence of multiple USIMs in a UE and the capabilities associated with the multiple USIMs from a first USIM of the UE through an access registration procedure, the multiple USIMs belong to a same network/operator (e.g., PLMN). With reference to FIG. 3, gNB 304 may receive the message through the access procedure from USIM1 of UE 302. The message indicates the presence of USIM1 and USIM2 in UE 302 and the capabilities associated with USIM1 and USIM2 (e.g., action 318 in FIG. 3). For example, in addition to USIM1 related information (e.g., phone number, IMSI, IMEI, TMSI, etc.), the message may also include USIM2 related information (e.g., phone number, IMSI, IMEI, TMSI, etc.) and the associated capabilities (e.g., NAS and/or AS capabilities) of each of USIM1 and USIM2. USIM1 and USIM2 belong to belong to the same network/operator (e.g., PLMN). Thereafter, gNB 304 may send the multi-USIM presence and the associated capabilities through the registration procedure to AMF 306 in action 320 (e.g., action 320 in FIG. 3). AMF 306 may then send the message to HSS 308 (e.g., action 322 in FIG. 3).

In action 484, the network may perform authentication procedures for the first USIM, between the first USIM and HSS, through the first USIM, first RF circuitry associated with the first USIM and the current access network system associated with the first USIM. For example, in FIG. 3, the network may perform authentication procedures for USIM1, between USIM1 and HSS 308, through USIM1, the RF circuitry associated with USIM1 (e.g., RF1 in FIG. 1), and the current access network system associated with USIM1 (e.g., actions 324, 326, 328, 330, 334 and 336 in FIG. 3).

In action 468, the network may perform authentication procedures for the second USIM, between the second USIM and HSS, through the first USIM, the first RF circuitry and the current access network system, autonomously based on at least one of a UE configuration and a system request. After successfully performing the authentication procedures for the first and second USIMs, the first and second USIMs are registered with the network/operator. For example, in FIG. 3, the network may perform authentication procedures for USIM2 through USIM1, the RF circuitry associated with USIM1 (e.g., RF1 in FIG. 1), and the current access network system associated with USIM1, autonomously based on at least one of UE 302's configuration and a system request (e.g., actions 338, 340, 342, 350 and 352 in FIG. 3). After successfully performing the authentication procedures for USIM1 and USIM2, USIM1 and USIM2 are authenticated and registered with AMF 306 and HSS 308.

Figure 5:
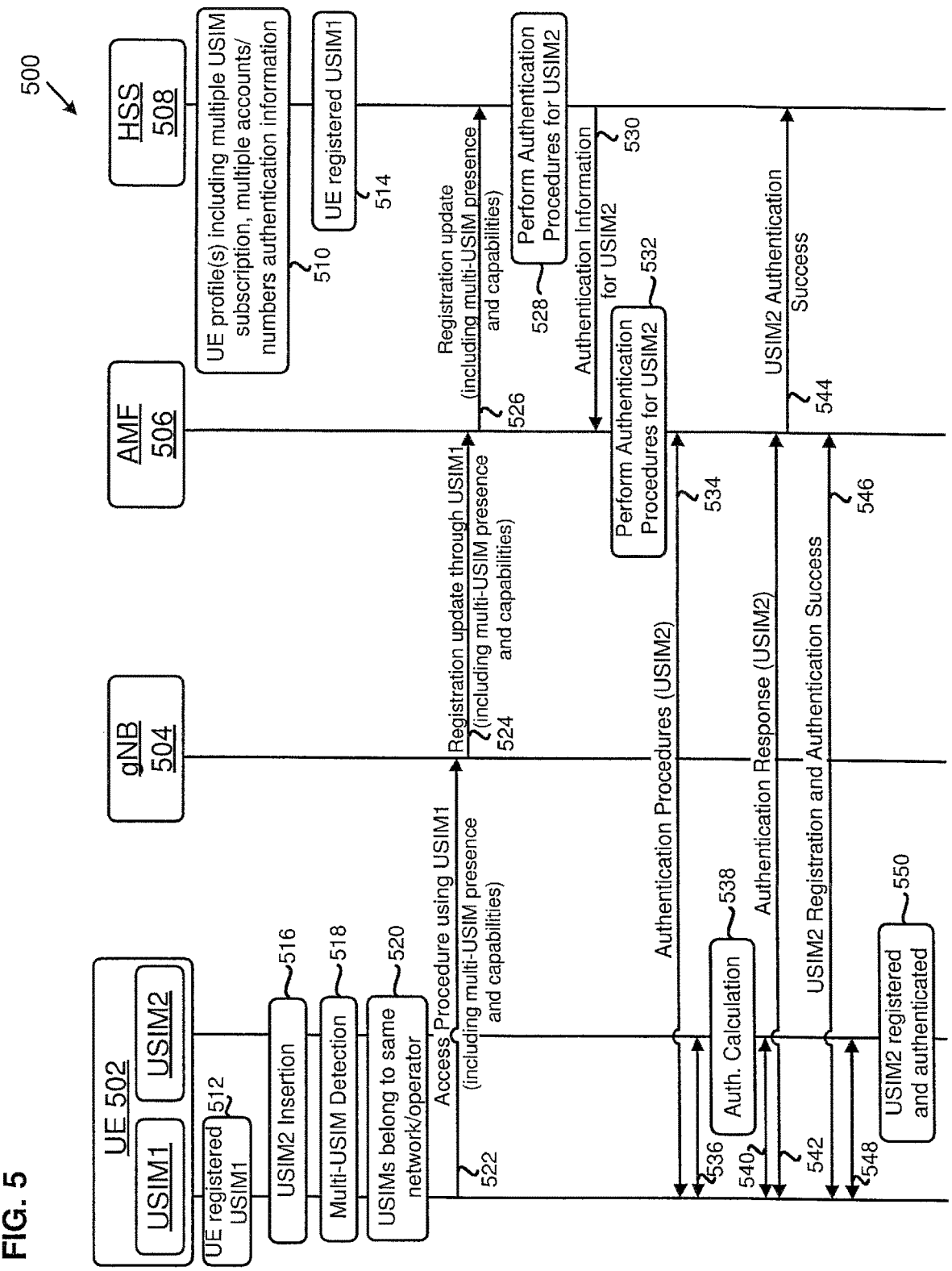
FIG. 5 is a signaling sequence diagram for schematically illustrating a method of reporting a multi-USIM presence and capabilities of the multiple USIMs to a wireless communication network through a registration update procedure, in accordance with example implementations of the present disclosure.

FIG. 5 is a signaling sequence diagram for schematically illustrating a method of reporting a multi-USIM presence and capabilities of the multiple USIMs to a wireless communication network through a registration update procedure, in accordance with example implementations of the present disclosure.

As shown in FIG. 5, in diagram 500, UE 502 may report the multi-USIM presence and the capabilities of the each USIM to HSS 508 through gNB 504 and AMF 506, for example, through one or more of actions 510, 512, 514, 516, 518, 520, 522, 524, 526, 528, 530, 532, 534, 536, 538, 540, 542, 544, 546, 548, and 550. In one implementation, UE 502 described in diagram 500 may correspond to multi-USIM UE 102 in FIG. 1. It should be noted that, although UE 502 is shown to include two USIMs (USIM1 and USIM2) in diagram 500, UE 502 may include and support more than two USIMs.

In action 510, HSS 508 may store UE profiles including multi-USIM subscriptions, multiple accounts/numbers authentication information for one or more UEs.

In action 512, USIM1 of UE 502's registration and authentication are successful. For example, the Attach is complete for USIM1.

In action 514, in HSS 508, USIM1 of UE 502 is registered and authenticated.

In action 516, USIM2 may be inserted into UE 502.

In action 518, UE 502 may detect a presence of multiple USIMs. For example, UE 502 (e.g., through multi-USIM processor 122 and USIM manager 134 in FIG. 1) may detect USIM2 while UE 502 is operating with USIM1 already registered with the network (e.g., AMF 506 and HSS 508). Thus, when USIM2 is inserted, UE 502 may detect the presence of both USIM1 and USIM2.

In action 520, UE 502 may determine if USIM and USIM2 belong to a same network/operator. In one implementation, UE 502 may check the operator IDs (e.g., PLMN IDs) associated with USIM1 and USIM2 to determine if the operator IDs are the same. For example, each operator ID may include a mobile country code (MCC) and a mobile network code (MNC). When the MCC and MNC of USIM1 match those of USIM2, then UE 502 determines that USIM and USIM2 belong to the same network/operator.

In action 522, UE 502 may initiate an access procedure with gNB 504 using USIM1. In the access procedure, UE 502 may send a message to gNB 504 using USIM1, the associated RF circuitry (e.g., RF1 in FIG. 1), and the current access network system of USIM1. The message may include an indication indicating the presence of USIM1 and USIM2 in UE 302, and USIM2 related information (e.g., phone number, IMSI, IMEI, TMSI, etc.) and the associated capabilities (e.g., NAS and/or AS capabilities) of USIM2. The message may also include updated capabilities of USIM1.

In action 524, gNB 504 may send the message having the multi-USIM presence and the associated capabilities of USIM1 and USIM2 to AMF 506 through a registration update procedure.

In action 526, AMF 506 may send the message having the multi-USIM presence and the associated capabilities of USIM1 and USIM2 to HSS 508 through the registration update procedure. In one implementation, actions 522, 524 and 526 may together be referred to as a registration update procedure.

Since USIM1 is already registered with HSS 508, after the registration update procedure in action 526, the authentication procedures for USIM2 may be performed, between USIM2 and HSS 508 through AMF 506, using USIM1 and the RF circuitry associated with USIM1 (e.g., RF1 in FIG. 1), autonomously based on at least one of UE 502's configuration and a system request.

In action 528, HSS 508 may initiate the authentication procedures of USIM2.

In action 530, HSS 508 may send authentication information for USIM2 to AMF 506. For example, HSS 508 may send an authentication token (AUTN), an expected response (XRES) and a random number (RAND) used to generate the XRES to AMF 506 for the authentication of USIM2.

In action 532, AMF 506 may perform the authentication procedures for USIM2 based on the authentication information from HSS 508.

In action 534, AMF 506 may send an authentication request for USIM2 to USIM1 of UE 502. The authentication request may be received by UE 502 through USIM1 and the RF circuitry associated with USIM1 (e.g., RF1 in FIG. 1).

The authentication request may include the RAND and the AUTN which it received from HSS 508.

In action 536, a USIM manager (e.g., USIM manager 134 in FIG. 1) of UE 502 may convey the authentication request from USIM1 to USIM2, for example, through tunneling.

In action 538, a USIM processor (e.g., multi-USIM processor 122 in FIG. 1) of UE 502 may process the authentication request, using the RAND it received and its preshared secret key to generate authentication parameters through authentication calculation.

In action 540, USIM2 may send an authentication response of USIM2, including a Response (RES), back to USIM1.

In action 542, USIM1 may send the authentication response of USIM2 back to AMF 506 through USIM1 and the RF associated with USIM1. If the RES of USIM2 from UE 502 matches the XRES AMF 506 received from HSS 508, then USIM2 is authenticated successfully.

In action 544, AMF 506 may send a USIM2 authentication success message to HSS 508.

In action 546, AMF 506 may send a registration and authentication success message to USIM1 through the associated RF circuitry (e.g., RF1 in FIG. 1) of USIM1.

In action 548, the USIM manager (e.g., USIM manager 134 in FIG. 1) of UE 502 may convey the registration and authentication success message from USIM1 to USIM2, for example, through tunneling.

In action 550, USIM2 of UE 502's registration and authentication are successful. For example, the Attach is complete for USIM2. For example, AMF 506 may start managing USIM2 of UE 502.

Figure 6A:
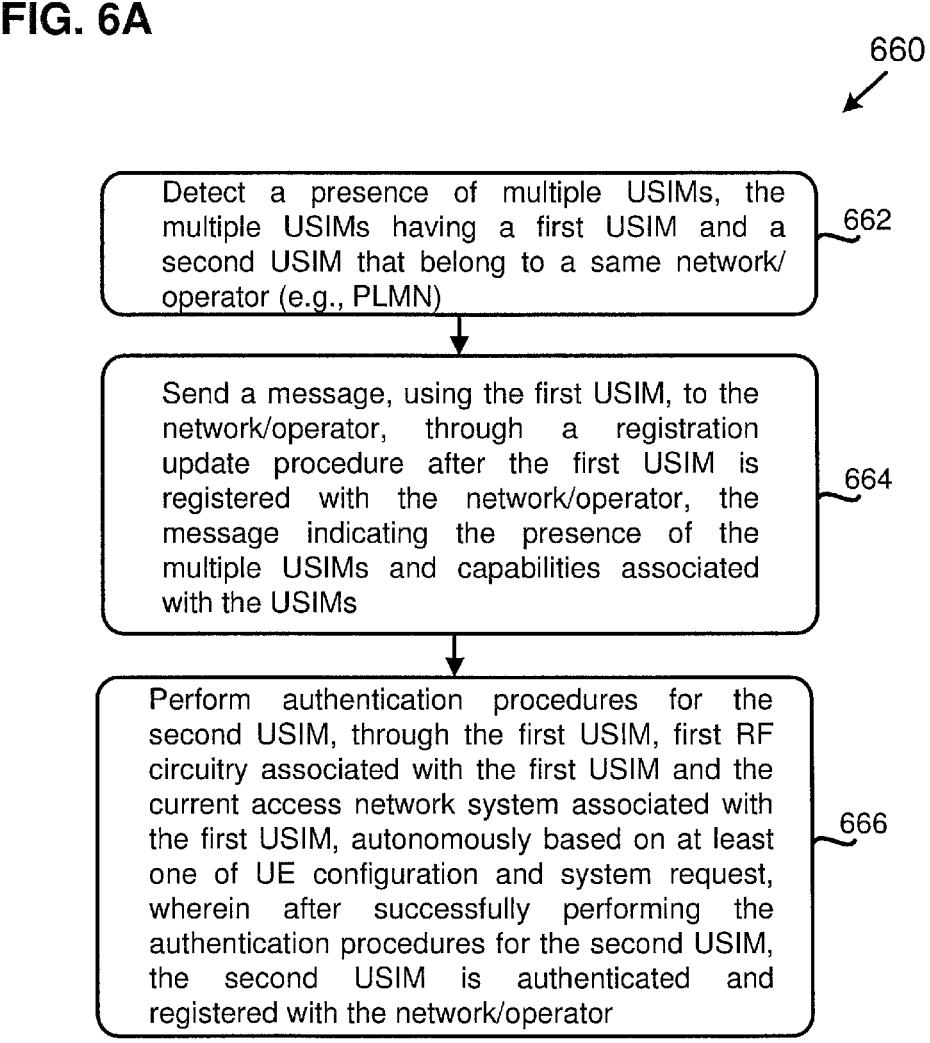
FIG. 6A is a flowchart diagram illustrating a method of a UE for multi-USIM registration in a wireless communication network through a registration update procedure, in accordance with example implementations of the present disclosure.

FIG. 6A is a flowchart diagram illustrating a method of a UE for multi-USIM registration in a wireless communication network through a registration update procedure, in accordance with example implementations of the present disclosure. As illustrated in FIG. 6A, flowchart 660 may include actions 662, 664, and 666. In the present implementation, the UE may correspond to multi-USIM UE 502 in FIG. 5.

In action 662, the UE may detect a presence of multiple USIMs in the UE. With reference to FIG. 5, USIM1 is registered with HSS 508, before USIM2 is inserted into UE 502. When USIM2 is inserted into UE 502, UE 502 (e.g., through multi-USIM processor 122 and USIM manager 134 in FIG. 1) may detect the presence of USIM2 in addition to USIM1. UE 502 may further determine that USIM1 and USIM2 belong to the same network/operator, for example, when the operator IDs (e.g., PLMN IDs) of USIM1 and USIM2 match.

In action 664, the UE may send a message, using a first USIM, to the network/operator, through a registration update procedure, the message indicating the presence of the multiple USIMs and the capabilities associated with the USIMs. For example, in FIG. 5, UE 502 may send the message, using USIM1 and the access network system associated with USIM1, to the network/operator (e.g., through gNB 504), through registration update procedure (e.g., actions 522, 524, and 526 in FIG. 5). The message may indicate to AMF 506 that there are multiple USIMs present in UE 502. The message may include USIM2 related information (e.g., phone number, IMSI, IMEI, TMSI, etc.) and the associated capabilities (e.g., NAS and/or AS capabilities) of USIM2. The message may also include updated capabilities of USIM1.

In action 666, the UE may perform authentication procedures for the second USIM, through the first USIM, the first RF circuitry associated with the first USIM and the current access network system associated with the first USIM, autonomously based on at least one of a UE configuration and a system request. After successfully performing the authentication procedures for the second USIM, the second USIM is registered with the network/operator. For example, in FIG. 5, UE 502 may perform authentication procedures for USIM2 through USIM1, the RF circuitry associated with USIM1 (e.g., RF1 in FIG. 1), and the current access network system associated with USIM1, autonomously based on at least one of UE 502's configuration and a system request (e.g., actions 534, 536, 538, 540, 542, 546, 548, and 550 in FIG. 5). After successfully performing the authentication procedures for USIM2, USIM2 is authenticated and registered with AMF 506 and HSS 508.

Figure 6B:
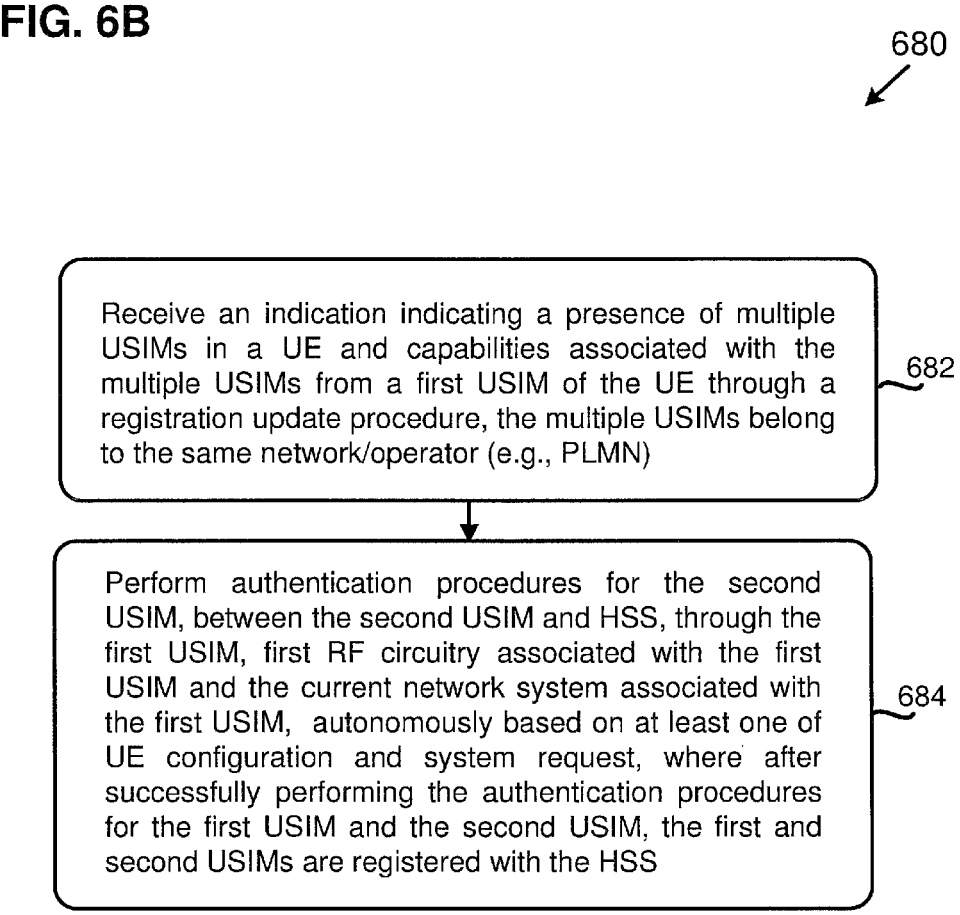
FIG. 6B is a flowchart diagram illustrating a method of a network for registering multiple USIMs and associated capabilities from a multi-USIM UE through a registration update procedure, in accordance with example implementations of the present disclosure.

FIG. 6B is a flowchart diagram illustrating a method of a network for registering multiple USIMs and associated capabilities from a multi-USIM UE through a registration update procedure, in accordance with example implementations of the present disclosure. As illustrated in FIG. 6B, flowchart 680 may include actions 682 and 684. In the one implementation, the network may include, not is not limited to, gNB 504, AMF 506, and HSS 508 in FIG. 5.

In action 682, the network may receive a message indicating a presence of multiple USIMs in a UE and capabilities associated with the multiple USIMs from a first USIM of the UE through a registration update procedure, the multiple USIMs belong to the same network/operator (e.g., PLMN). With reference to FIG. 5, gNB 504 may receive the message through the access procedure through USIM1 of UE 502 (e.g., action 522 in FIG. 5). The message indicates the presence of USIM1 and USIM2 in UE 502. The message includes USIM2 related information (e.g., phone number, IMSI, IMEI, TMSI, etc.) and the associated capabilities (e.g., NAS and/or AS capabilities). The message may also include updated capabilities of USIM1. USIM1 and USIM2 belong to belong to the same network/operator (e.g., PLMN). Thereafter, gNB 504 may send the multi-USIM presence and the associated capabilities through the registration update procedure to AMF 506 (e.g., action 524 in FIG. 5) in the registration update procedure. AMF 506 may then send the message to HSS 508 (e.g., action 526 in FIG. 5) in the registration update procedure.

In action 668, the network may perform authentication procedures for the second USIM, between the second USIM and HSS, through the first USIM, first RF circuitry associated with the first USIM and the current access network system associated with the first USIM, autonomously based on at least one of UE configuration and system request. After successfully performing the authentication procedures for the second USIM, both the first and second USIMs are authenticated and registered with the network. For example, in FIG. 5, the network may perform authentication procedures for USIM2 through USIM1, the RF circuitry associated with USIM1 (e.g., RF1 in FIG. 1), and the current access network system associated with USIM1, autonomously based on at least one of UE 502's configuration and a system request (e.g., actions 528, 530, 532, 534, 542, 544, and 546 in FIG. 5). After successfully performing the authentication procedures for USIM2, USIM1 and USIM2 are both registered with AMF 506 and HSS 508.

The methods illustrated in FIG. 3 (along with FIGS. 4A and 4B) and FIG. 5 (along with FIGS. 6A and 6B) allow a UE to report its multi-USIM capabilities, presence of two or more USIMs, and capabilities of simultaneous connections to the networks and indicate its network preference/priority list through an access registration procedure or a registration update procedure using one of the USIMs. In addition, the method illustrated in diagram 300 allows the handling of service prioritization and specifying the UE behavior upon reception of paging information based on USIM configuration and/or user preferences.

Figure 7:
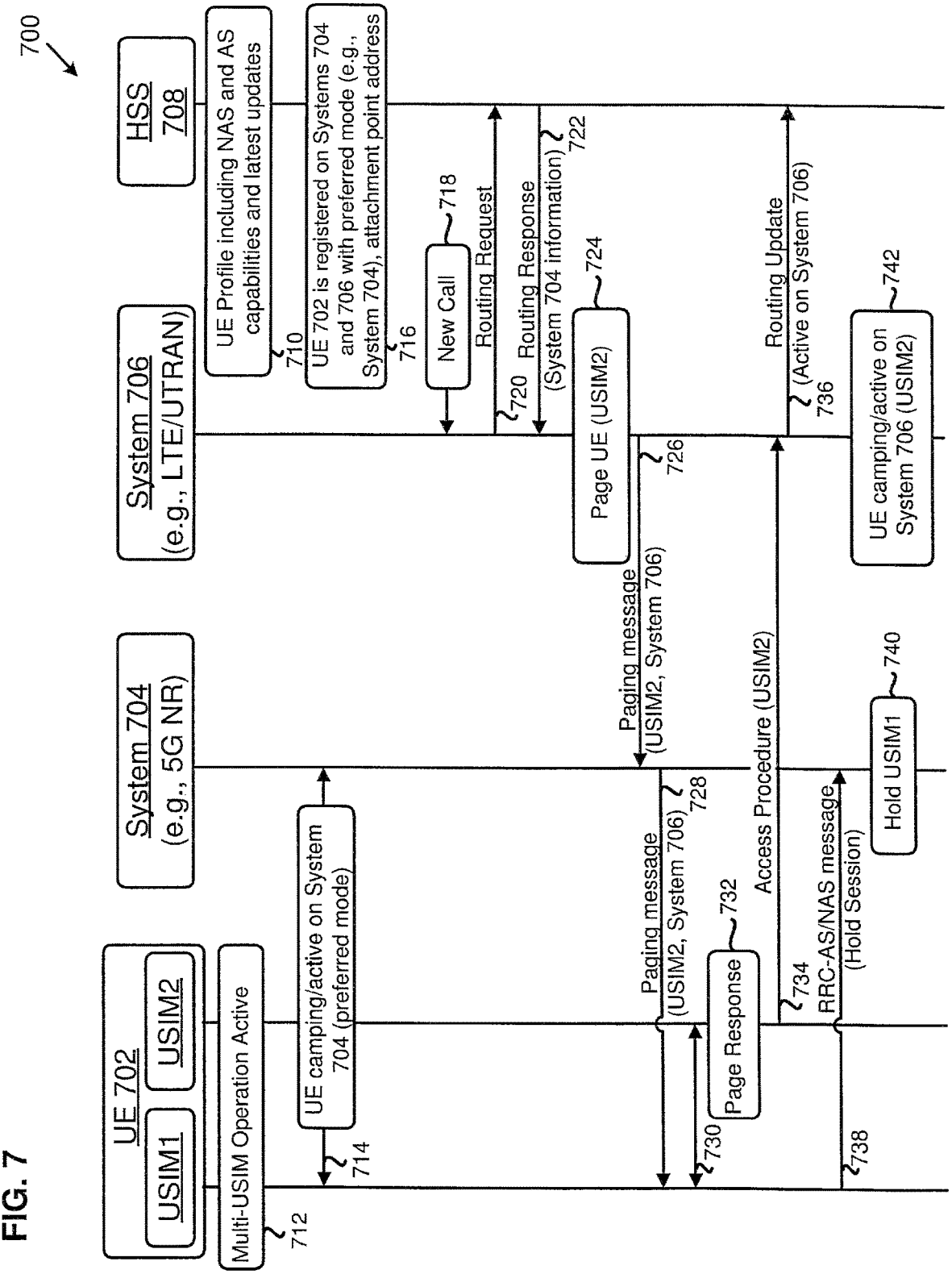
FIG. 7 is a signaling sequence diagram for schematically illustrating a method of delivering a service on a second access network system to a multi-USIM UE, while the UE is camping on a first access network system, in accordance with example implementations of the present disclosure.

FIG. 7 is a signaling sequence diagram for schematically illustrating a method of delivering a service on a second access network system to a multi-USIM UE, while the UE is camping on a first access network system, in accordance with example implementations of the present disclosure.

As shown in FIG. 7, in diagram 700, multi-USIM UE 702 (hereinafter "UE 702") may include USIM1 and USIM2, where USIM1 is configured to access network system 704 (hereinafter "system 704") (e.g., a 5G NR Internet Protocol (IP) network system), and USIM2 is configured to access network system 706 (hereinafter "system 706") (e.g., a Long-Term Evolution (LTE) network or a Universal Mobile Telecommunications Service (UMTS) Terrestrial Radio Access Network (UTRAN) IP network system). Systems 704 and 706 are communicatively coupled to HSS 708.

In present example implementation, diagram 700 illustrates a method of delivering a service on system 706 to UE 702, while UE 702 is camping on system 704 first access network system, through at least one of actions 710, 712, 714, 716, 718, 720, 722, 724, 726, 728, 730, 732, 734, 736, 738, 740, and 742.

In one implementation, UE 702 described in diagram 700 may correspond to multi-USIM UE 102 in FIG. 1. It should be noted that, although UE 702 is shown to include two USIMs (USIM1 and USIM2) in diagram 700, UE 702 may include and support more than two USIMs.

In the present implementation, before action 710, the registration and authentication of USIM1 and USIM2 have been successful. For example, the Attach is complete for each of USIM1 and USIM2. For example, action 710 may be subsequent to action 352, where USIM1 and USIM2 are authenticated and registered with AMF 306 and HSS 308 in FIG. 3. In another example, action 710 may be subsequent to action 550, where USIM1 and USIM2 are authenticated and registered with AMF 506 and HSS 508 in FIG. 5.

In action 710, HSS 708 has stored UE 702's profile including NAS and AS capabilities and the latest updates.

In action 712, multi-USIM operation may be active in UE 702.

In action 714, UE 702 may camp or be active on system 704 using USIM1 through the RF circuitry associated with USIM1 (e.g., RF1 in FIG. 1), where system 704 is the preferred access network system.

In action 716, UE 702 may be registered with systems 704 and 706 with preferred system 704. HSS 708 may store the addresses of the network attachment points of UE 702.

In action 718, system 706 may receive a new call on network system 706 for USIM2 of UE 702. In one implementation, the call may be a circuit switched voice call. In another implementation, the call may be a voice call in a voice over internet protocol (VoIP) format. In yet another implementation, the call may include a voice component and/or a media component with their respective attributes. For example, the call may include IP multimedia core network subsystem (IMS) session content having voice call content in IMS domain and multimedia content in IMS domain.

In action 720, system 706 may send a routing request to HSS 708 to find a routing path for the call to UE 702.

In action 722, HSS 708 may send a routing response to system 706, where the routing response includes information regarding system 704 and USIM1 of UE 702.

In action 724, system 706 may start paging USIM2 of UE 702.

In action 726, system 706 may send a paging message for USIM2 to system 704 based on the routing response from HSS 708. The paging message may include information of USIM2 and system 706.

In action 728, system 704 may send the paging message for USIM2 to USIM1 and the RF circuitry associated with USIM1 (e.g., RF1 in FIG. 1) of UE 702.

In action 730, a USIM manager (e.g., USIM manager 134 in FIG. 1) may convey the paging message from USIM1 to USIM2, for example, through tunneling.

In action 732, a USIM processor (e.g., multi-USIM processor 122 in FIG. 1) may process the paging message, and generate a paging response to the paging message.

In action 734, UE 702 may perform an access procedure with system 706 using USIM2 and the RF circuitry associated with USIM2 (e.g., RF2 in FIG. 1), for example, to send the paging response to system 706.

In action 736, system 706 may send a routing update to HSS 708 to activate USIM2 on system 706.

In action 738, UE 702 may send a hold message (e.g., an RRC-AS/NAS message) to system 704 using USIM1 and the RF circuitry associated with USIM1 (e.g., RF1 in FIG. 1) to put a service (e.g., an active call and/or data session) between USIM1 and system 704 on hold.

In action 740, upon receiving the hold message from USIM1, system 704 may put the service between USIM1 and system 704 on hold.

In action 742, system 706 may activate the call with UE 702 using USIM2, while the service between USIM1 and system 704 is on hold.

In some implementations, after the call using USIM2 on system 706, UE 702 may revert back to system 704 to resume the service between USIM1 and system 704. In some implementations, after the call using USIM2 on system 706, UE 702 may stay in system 706 and end the service between USIM1 and system 704.

Figure 8A:
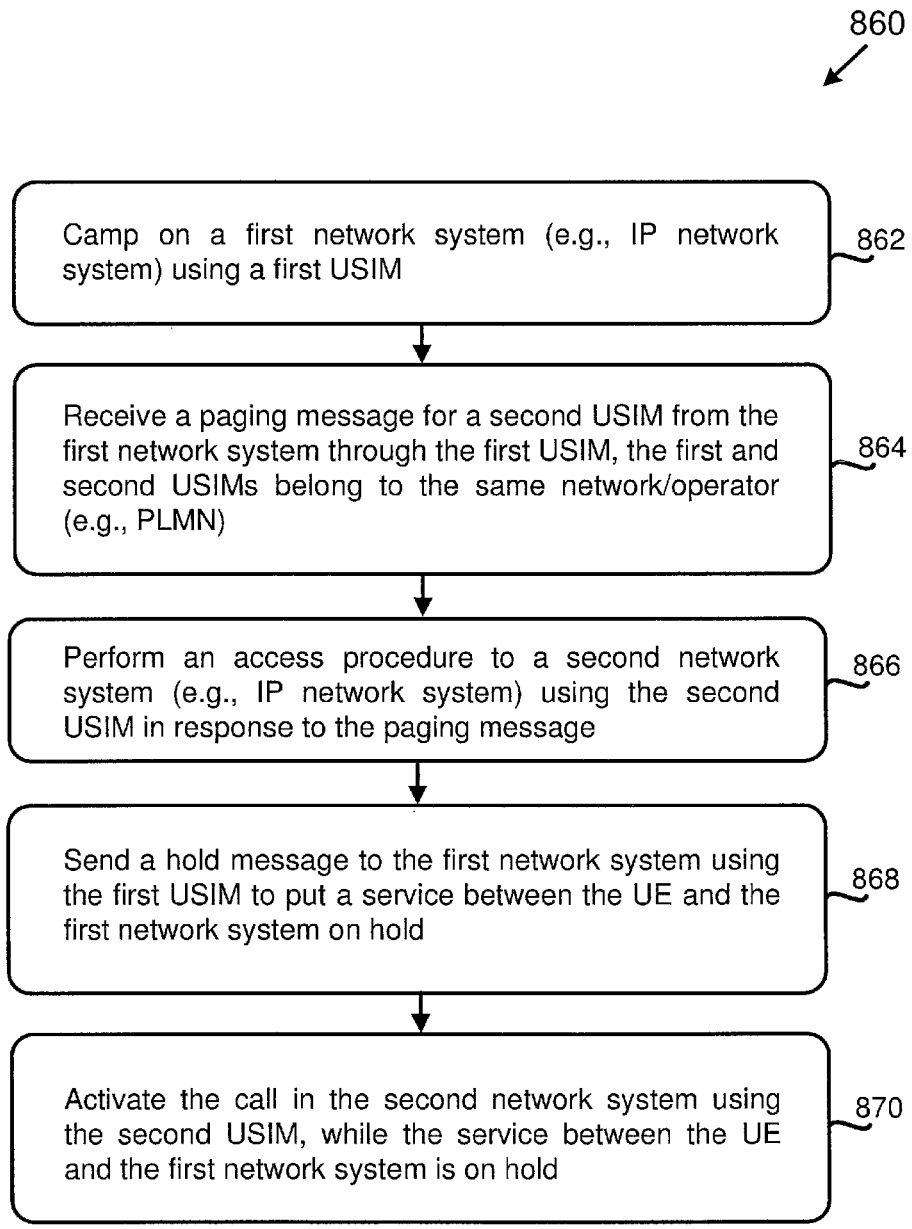
FIG. 8A is a flowchart diagram illustrating a method of a multi-USIM UE for activating a service (e.g., a call and/or data session) on a second network system while maintaining a network connection with a first network system, in accordance with example implementations of the present disclosure.

FIG. 8A is a flowchart diagram illustrating a method of a multi-USIM UE for activating a service (e.g., a call and/or data session) on a second network system while maintaining a network connection with a first network system, in accordance with example implementations of the present disclosure. As illustrated in FIG. 8A, flowchart 860 may include actions 862, 864, 866, 868, and 870. In the present implementation, the UE may correspond to multi-USIM UE 702 in FIG. 7.

In action 862, the UE may camp on a first network system (e.g., IP network system) using a first USIM. With reference to FIG. 7, UE 702 may camp or be active on system 704 using USIM1, where system 704 is the preferred network system (e.g., action 714 in FIG. 7).

In action 864, the UE may receive a paging message for a second USIM from the first network system through the first USIM, the first and second USIMs belong to the same network/operator (e.g., PLMN). For example, in FIG. 7, UE 702 may receive the paging message for USIM2 from system 704 through USIM1 and the RF circuitry associated with USIM1 (e.g., RF1 in FIG. 1) (e.g., action 728 in FIG. 7). The USIM manager (e.g., USIM manager 134 in FIG. 1) of UE 702 may convey the paging message from USIM1 to USIM2, for example, through tunneling (e.g., action 730 in FIG. 7).

In action 866, the UE may perform an access procedure to a second network system (e.g., IP network system) using the second USIM in response to the paging message. For example, in FIG. 7, the USIM processor (e.g., multi-USIM processor 122 in FIG. 1) may process the paging message, and generate the paging response to the paging message. UE 702 may perform the access procedure with system 706 using USIM2 and the RF circuitry associated with USIM2 (e.g., RF2 in FIG. 1), for example, to send the paging response to system 706 (e.g., actions 732 and 734 in FIG. 7).

In action 868, the UE may send a hold message to the first network system using the first USIM to put a service (e.g., an active call and/or data session) between the UE and the first network system on hold. For example, in FIG. 7, UE 702 may send the hold message (e.g., an RRC-AS/NAS message) to system 704 using USIM1 and the RF circuitry associated with USIM1 (e.g., RF1 in FIG. 1) to put a service (e.g., an active call and/or data session) between USIM1 and system 704 on hold (e.g., action 738).

In action 870, the UE may activate the call in the second network system using the second USIM, while the service between the UE and the first network system is on hold. For example, in FIG. 7, UE 702 may activate the call in system 706 using USIM2, while the service between USIM1 and system 704 is on hold.

FIG. 8B is a flowchart diagram illustrating a method of a network for activating a service (e.g., a call and/or data session) with a UE on a second network system while maintaining a network connection with the UE on a first network system, in accordance with example implementations of the present disclosure.

As illustrated in FIG. 8B, flowchart 880 may include actions 882, 884, 886, 888, 890, 892, 894, 896, and 898. In the present implementation, the network may include, not is not limited to, system 704, system 706, and HSS 708 in FIG. 7.

In action 882, multiple-USIMs of a UE are registered with an HSS. The HSS is communicatively coupled to a first network system (e.g., IP network system) accessible by a first USIM through first RF circuitry of the UE. The HSS is also communicatively coupled to a second network system (e.g., IP network system) accessible by a second USIM through second RF circuitry of the UE. For example, in FIG. 7, USIM1 and USIM2 of UE 702 are respectively registered with systems 704 and 706, where system 704 may be accessible by USIM1 through the RF circuitry associated with USIM1 (e.g., RF1 in FIG. 1), and system 706 may be accessible by USIM2 through the RF circuitry associated with USIM2 (e.g., RF2 in FIG. 1). HSS 708 may store UE 702's profile including NAS and AS capabilities and the latest updates (e.g., action 710 in FIG. 7). HSS 708 may also store the addresses of the network attachment points of UE 702 (e.g., action 716 in FIG. 7).

In action 884, the HSS may receive a routing request from the second network system after the second network system receives a call for the second USIM of the UE, when the UE is camping on the first network system using the first USIM. For example, in FIG. 7, system 706 receives the new call on network system 706 for USIM2 of UE 702 (e.g., action 718 in FIG. 7). System 706 may send the routing request to HSS 708 to find a routing path for the call to UE 702 (e.g., action 720 in FIG. 7).

In action 886, the HSS may provide a routing response to the second network system, the routing response including information, associated with the first network system and the first USIM of the UE, for the second IP network system to send a paging message for the second USIM to the UE through the first IP network system. For example, in FIG. 7, HSS 708 may send the routing response to system 706, where the routing response includes information regarding system 704 and USIM1 of UE 702 (e.g., action 722 in FIG. 7).

In action 888, the second network system may send a paging message for the second USIM to the first network system based on the routing response from the HSS. For example, in FIG. 7, system 706 may start paging USIM2 of UE 702 and send the paging message for USIM2 to system 704 based on the routing response from HSS 708 (e.g., actions 724 and 726 in FIG. 7). The paging message may include information of USIM2 and system 706.

In action 890, the first network system may send the paging message for the second USIM to the first USIM and the RF circuitry associated with the first USIM of the UE. For example, in FIG. 7, system 704 may send the paging message for USIM2 to USIM1 of the UE through the RF circuitry associated with USIM1 (e.g., RF1 in FIG. 1) (e.g., action 728 in FIG. 7).

In action 892, the second network system may receive a paging response from the second USIM of the UE through the RF circuitry associated with the second USIM in an access procedure. For example, in FIG. 7, system 706 may receive the paging response from USIM2 of UE 702. UE 702 may perform the access procedure with system 706 using USIM2 and the RF circuitry associated with USIM2 (e.g., RF2 in FIG. 1) to send the paging response to system 706 (e.g., action 734 in FIG. 7).

In action 894, the second network system may provide a routing update to the HSS to activate the second USIM on the second network system. For example, in FIG. 7, system 706 may send the routing update to HSS 708 to activate USIM2 on system 706 (e.g., action 736 in FIG. 7).

In action 896, the first network system may receive a hold message from the first USIM, and put the first USIM on hold in response to the hold message. For example, in FIG. 7, system 704 may receive the hold message (e.g., an RRC-AS/NAS message) from USIM1 of UE 702 through the RF circuitry associated with USIM1 (e.g., RF1 in FIG. 1) to put the service (e.g., an active call and/or data session) between USIM1 and system 704 on hold (e.g., action 738 in FIG. 7). In response to the hold message from USIM1, system 704 may put the service (e.g., an active call and/or data session) between USIM1 and system 704 on hold (e.g., action 740 in FIG. 7).

In action 898, the second network system may activate the call with the UE on the second network system using the second USIM, while the service between the first USIM and the first network system is on hold. For example, in FIG. 7, system 706 may activate the call with UE 702 using USIM2, while the service between USIM1 and system 704 is on hold (e.g., action 742 in FIG. 7).

The methods illustrated in FIGS. 7, 8A, and 8B allow the delivery of a paging message destined to one USIM, while the UE is actively communicating with another USIM on a different network system. The method illustrated in diagram 700 also allows the network to handle mobile-terminated data or control-plane activity occurrence on a suspended connection requested by the UE. Thus, paging collisions occurring in the UE among active multiple USIMs can be avoided. The method allows a multi-USIM UE to handle emergency calls and sessions. As such, the network and the UE can maintain RRC and CN state while moving from one system to another substantially without any interruption to either sessions/services. In addition, the method illustrated in diagram 700 allows the handling of service prioritization and specifying the UE behavior upon reception of paging information based on USIM configuration and/or user preferences.

CROSS REFERENCE

This Nonprovisional application claims priority under 35 U.S.C. § 119 on provisional Application No. 62,861,316 on Jun. 13, 2019, the entire contents of which are hereby incorporated by reference.

What is claimed is:

1. A user equipment (UE) for wireless communication, the UE comprising:
one or more non-transitory computer-readable media storing computer executable instructions; and
at least one processor coupled to the one or more non-transitory computer-readable media, and configured to execute the computer-executable instructions to:
detect a presence of a first multiple-universal subscriber identity module (USIM) and a second USIM in the UE, the first and second USIMs belonging to a same Public Land Mobile Network (PLMN); and
send a message, using the first USIM, to the PLMN through either an access registration procedure or a registration update procedure, the message indicating the presence of the first and second USIMs and capabilities associated with the first and second USIMs,
the UE further comprising first Radio Front-end (RF) circuitry associated with the first USIM, and second RF circuitry associated with the second USIM,
wherein the at least one processor is further configured to execute the computer-executable instructions to:
perform the access registration procedure;
perform authentication procedures for the first USIM through the first RF circuitry; and
perform authentication procedures, for the second USIM through the first USIM and the first RF circuitry, autonomously based on at least one configuration of the UE and a system request,
after successfully performing the authentication procedures for the first and second USIMs, the first and second USIMs are registered with the PLMN.

2. A user equipment (UE) for wireless communication, the UE comprising:
one or more non-transitory computer-readable media storing computer executable instructions; and
at least one processor coupled to the one or more non-transitory computer-readable media, and configured to execute the computer-executable instructions to:
detect a presence of a first multiple-universal subscriber identity module (USIM) and a second USIM in the UE, the first and second USIMs belonging to a same Public Land Mobile Network (PLMN); and
send a message, using the first USIM, to the PLMN through either an access registration procedure or a registration update procedure, the message indicating the presence of the first and second USIMs and capabilities associated with the first and second USIMs,
the UE further comprising first Radio Front-end (RF) circuitry associated with the first USIM, and second RF circuitry associated with the second USIM,
wherein the at least one processor is further configured to execute the computer-executable instructions to:
perform the registration update procedure, after the first USIM is registered with the PLMN; and
perform authentication procedures, for the second USIM through the first USIM and the first RF circuitry, autonomously based on at least one configuration of the UE and a system request,
after successfully performing the authentication procedures for the second USIM, the second USIM is registered with the PLMN.

3. A user equipment (UE) for wireless communication, the UE comprising:
one or more non-transitory computer-readable media storing computer executable instructions; and
at least one processor coupled to the one or more non-transitory computer-readable media, and configured to execute the computer-executable instructions to:
detect a presence of a first multiple-universal subscriber identity module (USIM) and a second USIM in the UE, the first and second USIMs belonging to a same Public Land Mobile Network (PLMN); and
send a message, using the first USIM, to the PLMN through either an access registration procedure or a registration update procedure, the message indicating the presence of the first and second USIMs and capabilities associated with the first and second USIMs,
wherein:
the first USIM is configured to access a first Internet Protocol (IP) network system through first Radio Front-end (RF) circuitry;
the second USIM is configured to access a second IP network system through second RF circuitry;
after the first and second USIMs are registered with the PLMN, the at least one processor is further configured to execute the computer-executable instructions to:
camp on the first IP network system using the first USIM;
receive a paging message for the second USIM from the first IP network through the first USIM;
perform an access procedure to the second IP network system using the second USIM;
send a hold message to the first IP network system using the first USIM to put a service between the UE and the first IP network system on hold; and
activate a call in the second IP network system using the second USIM, while the service between the UE and the first IP network system is on hold.

4. The UE of claim 3, wherein the first IP network system includes a fifth generation (5G) new radio (NR) IP network.

5. The UE of claim 3, wherein the second IP network system includes a Long-Term Evolution (LTE) network or a Universal Mobile Telecommunications Service (UMTS) Terrestrial Radio Access Network (UTRAN).

* * * * *